(12) United States Patent
Langer

(10) Patent No.: US 10,615,593 B2
(45) Date of Patent: Apr. 7, 2020

(54) INRUSH CURRENT LIMIT CIRCUITRY AND METHOD

(71) Applicant: Microsemi P.O.E Ltd., Hod Hasharon (IL)

(72) Inventor: Tamir Langer, Tel Aviv (IL)

(73) Assignee: MICROSEMI P.O.E. LTD., Hod Hasharon (IL)

(*) Notice: Subject to any disclaimer, the term of this patent is extended or adjusted under 35 U.S.C. 154(b) by 283 days.

(21) Appl. No.: 15/805,165

(22) Filed: Nov. 7, 2017

(65) Prior Publication Data

US 2018/0152017 A1      May 31, 2018

Related U.S. Application Data

(60) Provisional application No. 62/427,189, filed on Nov. 29, 2016.

(51) Int. Cl.
*H02H 9/08* (2006.01)
*H02H 9/02* (2006.01)
*H02H 9/00* (2006.01)

(52) U.S. Cl.
CPC ............ *H02H 9/025* (2013.01); *H02H 9/001* (2013.01)

(58) Field of Classification Search
CPC ...................................... H02H 9/025
USPC ........................................................ 361/93.9
See application file for complete search history.

(56) References Cited

U.S. PATENT DOCUMENTS

| | | | |
|---|---|---|---|
| 6,335,654 B1 | 1/2002 | Cole | |
| 7,019,583 B2 | 3/2006 | Del Signore, II et al. | |
| 9,063,558 B2 * | 6/2015 | Fukumura | G05F 1/573 |
| 2005/0286200 A1 * | 12/2005 | Ohshima | H03K 17/0822 361/160 |

* cited by examiner

*Primary Examiner* — Thienvu V Tran
*Assistant Examiner* — Lucy M Thomas
(74) *Attorney, Agent, or Firm* — Glass and Associates; Kenneth Glass

(57) ABSTRACT

An inrush current limiting method not requiring the use of a sense resistor, the method constituted of: generating a ramped voltage; comparing a first function of a voltage across a port capacitor with the generated ramp voltage; responsive to the outcome of the comparison of the voltage first function with the ramp voltage, controlling an electronically controlled switch coupled to the port capacitor such that the voltage across the port capacitor is a linear function of the generated ramped voltage; comparing a second function of the voltage at a terminal of the electronically controlled switch with a predetermined reference voltage; and responsive to the outcome of the comparison indicating that the second function of the terminal voltage is greater than the predetermined reference voltage, pulling the generated ramp voltage towards a predetermined shutoff voltage.

6 Claims, 3 Drawing Sheets

INRUSH CURRENT LIMIT CIRCUITRY AND METHOD

TECHNICAL FIELD

The invention relates generally to the field of powered devices and particularly to a circuitry and method for inrush current limiting.

BACKGROUND

Power over Ethernet provides for a power supply equipment (PSE) which supplies power over structured cabling to a remotely stationed powered device (PD). During initial power up of a PD, the port capacitor draws an inrush current from the PSE which may be very large. In accordance with current standards, the inrush current into the powered device must be limited, under certain conditions as defined therein, to a maximum value. Prior art current limiters use a sense resistor to sense the value of the inrush current and control a transistor within the current path to limit the inrush current to the acceptable maximum value. Unfortunately, the inrush current flowing through the sense resistor dissipates heat which wastes power. Additionally, the sense resistor must be very accurate, which adds cost.

SUMMARY OF THE INVENTION

Accordingly, it is a principal object of the present invention to overcome at least some of the disadvantages of prior art. This is provided in one embodiment by an inrush current limit circuitry comprising: a first electronically controlled switch, a first terminal of the first electronically controlled switch in electrical communication with a port capacitor; a ramp voltage circuitry arranged to generate a ramped voltage at an output thereof; a first differential amplifier, a first input of the first differential amplifier arranged to receive a first function of the voltage across the port capacitor, a second input of the first differential amplifier coupled to the output of the ramp voltage circuitry and an output of the first differential amplifier coupled to a second terminal of the electronically controlled switch such that the voltage across the port capacitor is a linear function of the generated ramped voltage; a second electronically controlled switch, a first terminal of the second electronically controlled switch coupled to the output of the ramp voltage circuitry and a second terminal of the second electronically controlled switch coupled to a predetermined common voltage such that the second electronically controlled switch is arranged in a closed state to pull the output of the ramp voltage circuitry towards the predetermined common voltage; and a first comparator, a first input of the first comparator arranged to receive a second function of the voltage at the first terminal of the first electronically controlled switch, a second input of the first comparator arranged to receive a predetermined reference voltage and an output of the first comparator coupled to a third terminal of the second electronically controlled switch such that the second electronically controlled switch is alternately opened and closed responsive to the output of the first comparator.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings.

DETAILED DESCRIPTION OF THE PREFERRED EMBODIMENTS

Figure 1:
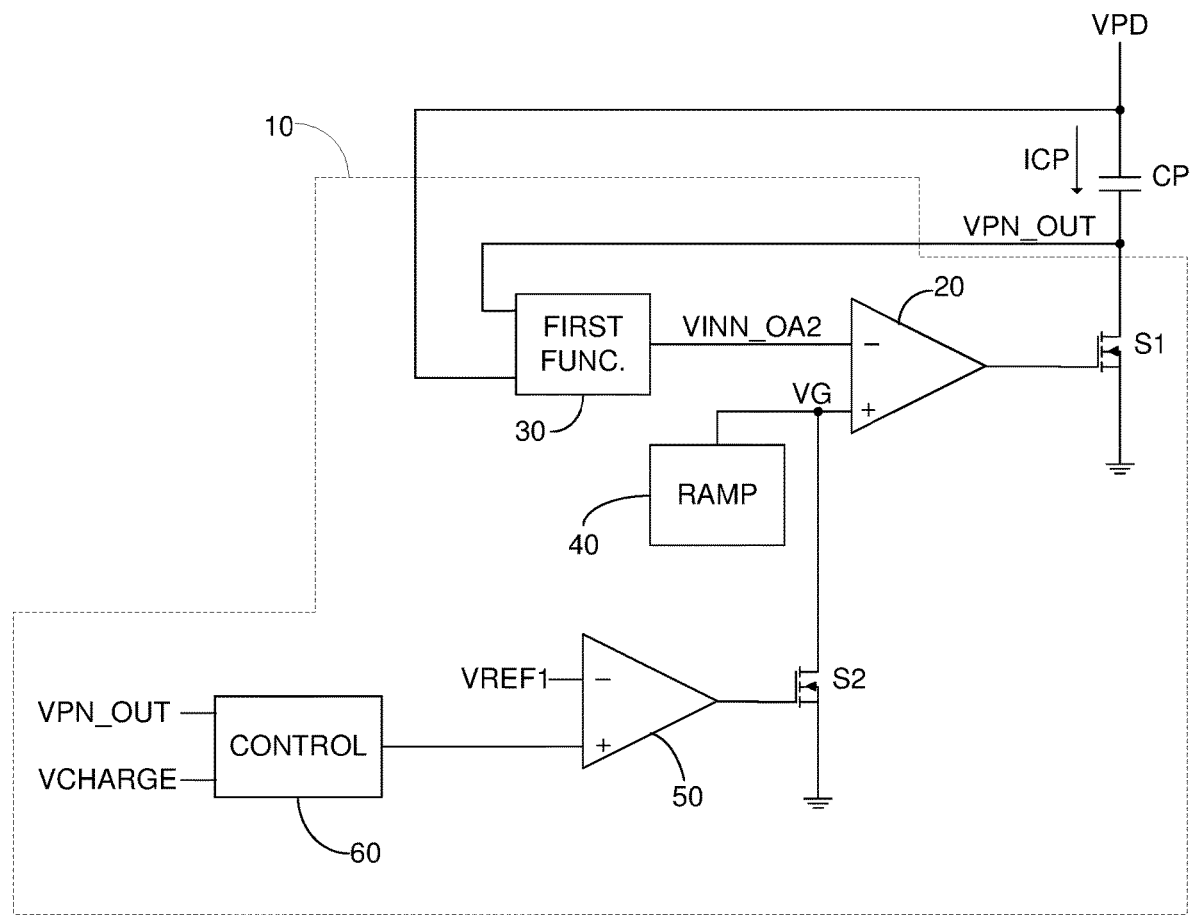
FIG. 1 illustrates a high level schematic diagram of an inrush current limit circuitry, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level schematic diagram of an inrush current limit circuitry 10 comprising: an electronically controlled switch S1, implemented and described herein in one non-limiting embodiment as an n-channel metal-oxide-semiconductor field-effect-transistor (NFET); a differential amplifier 20; a first function circuitry 30; a ramp voltage circuitry 40; an electronically controlled switch S2, implemented and described herein in one non-limiting embodiment as an NFET; a comparator 50; and a control circuitry 60. A port capacitor CP and a supply voltage VPD are further illustrated external to inrush current limit circuitry 10. The inrush current charges port capacitor CP, the inrush current denoted $I_{CP}$. A load (not shown) is provided across port capacitor CP, and thus any load current flows from supply voltage VPD through the load returning via electronically controlled switch S1. The term differential amplifier, as used throughout this document, is understood to mean an amplifier whose output is proportional to the difference between the voltages applied to its two inputs. Comparators, as used throughout this document, may integrate hysteresis circuitry to increase noise immunity, without exceeding the scope.

A first end of port capacitor CP is coupled to supply voltage VPD and a respective input of first function circuitry 30. The drain of NFET S1 is coupled to a second end of port capacitor CP and a respective input of first function circuitry 30, the signal thereon denoted VPN_OUT. An output of first function circuitry 30 is coupled to an inverting input of differential amplifier 20, the signal thereon denoted VIN-N_OA2. The output of differential amplifier 20 is coupled to the gate of NFET S1. A non-inverting input of differential amplifier 20 is coupled to an output of ramp voltage circuitry 40, the signal thereon denoted VG, and to the drain of NFET S2. The source of each of NFETs S1 and S2 is coupled to a common potential, illustrated without limitation as ground. The gate of NFET S2 is coupled to an output of comparator 50 and an inverting input of comparator 50 is coupled to a reference voltage, denoted VREF1. A non-inverting input of comparator 50 is coupled to an output of control circuitry 60 and a first input of control circuitry 60 is coupled to the drain of NFET S1 (connection not shown for simplicity) carrying signal VPN_OUT. A second input of control circuitry 60 is coupled to a predetermined voltage signal, denoted VCHARGE.

In operation, first function circuitry 30 is arranged to output a first function of the voltage across port capacitor CP, i.e. VPD−VPN_OUT as signal VINN_OA2. Additionally, ramp voltage circuitry 40 is arranged to generate a linear ramped voltage at the output thereof, the signal denoted VG as indicated above. Differential amplifier 20 is arranged to amplify the difference between signal VIN-N_OA2 and signal VG, thereby controlling the gate voltage of NFET S1 such that VINN_OA2 tracks signal VG, and since input voltage VPD is fixed, voltage VPN_OUT tracks signal VG, as further described below. Thus, port capacitor CP is charged with current so as to exhibit a linear ramped voltage there across, ensuring that the inrush current exhibits a fixed magnitude. Particularly, the magnitude of the inrush current for port capacitor CP is given as:

$$I_{CP}=C_{CP}*dV_{CP}/dt \quad \text{EQ. 1}$$

where $C_{CP}$ is the capacitance of port capacitor CP and $V_{CP}$ is the voltage across port capacitor CP, i.e. VPD−VPN_OUT. For a linearly ramped voltage $V_{CP}$, the derivative thereof is a fixed value. As a result, the magnitude of inrush current $I_{CP}$ is a fixed value, the value being controlled by ramp voltage circuitry 40 and first function circuitry 30, as will be described further below.

As will be described further below, comparator 50 is arranged to compare a predetermined function of drain voltage VPN_OUT, provided by control circuitry 60, with reference voltage VREF1. In the event that the provided function of drain voltage VPN_OUT exceeds reference voltage VREF1, which is an indication of a short circuit across port capacitor CP, thus the voltage drop across S1 is greater than VREF1, which here functions a short circuit maximum current limit value, comparator 50 is arranged to close NFET S2 thereby pulling signal VG to the common potential. Responsive to signal VG being pulled to the common potential, differential amplifier 20 switches off NFET S1 and the current flowing into port capacitor CP is cut off. Control circuitry 60 provides short circuit protection during 2 separate operating modes: during charge up of port capacitor CP; and during operation when port capacitor CP is assumed to be fully charged. Particularly, as will be described below, during the charge up mode, VPN_OUT is not initially coupled to the non-inverting input of comparator 50 by control circuitry 60. When port capacitor CP is finished charging, VPN_OUT is equal to VCHARGE, or to a function thereof, and responsive thereto control circuitry 60 detects that the operation mode is initiated and responsive to the detection connects voltage VPN_OUT to the non-inverting input of comparator 50. In further detail, during operation mode, the voltage across NFET S1 should not be higher than the maximum allowed current flowing therethrough multiplied by the on resistance thereof, which is reflected by reference voltage VREF1. Therefore, if the voltage thereacross, or a predetermined function thereof, exceeds VREF1, NFET S1 is shut off.

Additionally, as will be described below, in the event that there is a short circuit condition during charging of port capacitor CP, i.e. during startup mode, control circuitry 60 detects that the voltage across port capacitor CP is not linearly ramped. In such an event, control circuitry 60 connects voltage VPN_OUT to the non-inverting input of comparator 50. Since port capacitor CP is not completely charged, VPN_OUT is greater than VREF1 and differential amplifier 20 switches off NFET S1, as described above.

Figure 2:
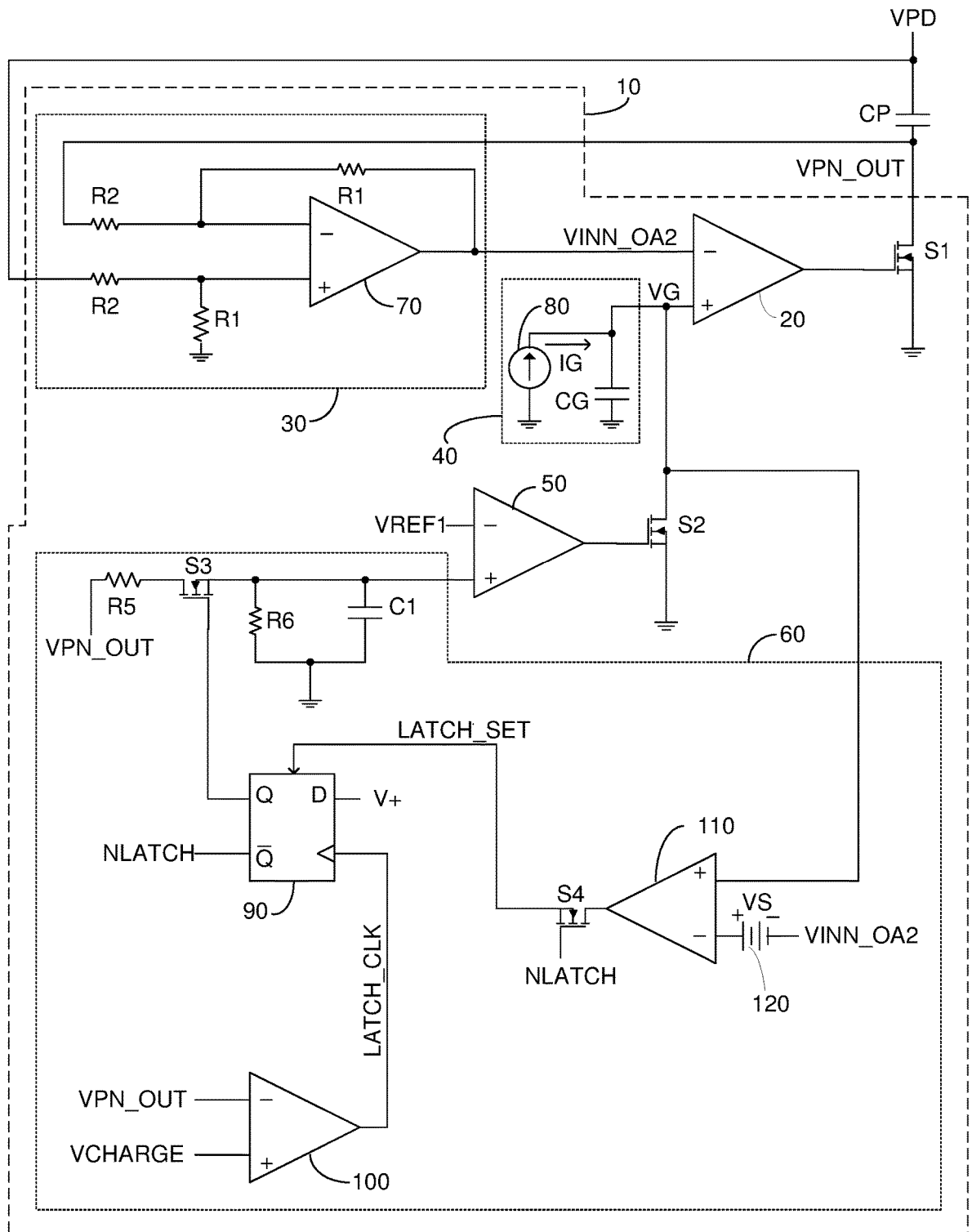
FIG. 2 illustrates a high level schematic diagram of a more detailed embodiment of the inrush current limit circuitry of FIG. 1, according to certain embodiments.

FIG. 2 illustrates a high level schematic view of a more detailed embodiment of inrush current limiting circuitry 10. Particularly, first function circuitry 30 comprises: a differential amplifier 70; a pair of resistors R1; and a pair of resistors R2, thus functioning as a difference amplifier, where the output voltage is a linear function of the difference between the input voltages. Ramp voltage circuitry comprises: a current source 80; and a capacitor CG. Control circuitry 60 comprises: a pair of resistors R5 and R6; an electronically controlled switch S3, implemented and described herein in one non-limiting embodiment as an NFET; a capacitor C1; a latch 90, implemented and described herein in one non-limiting embodiment as a D flip flop; a comparator 100; an electronically controlled switch S4, implemented and described herein in one non-limiting embodiment as an NFET; a comparator 110; and a voltage source 120.

The inverting input of differential amplifier 20 is coupled to a first end of first resistor R1 and an output of differential amplifier 70. A second end of first resistor R1 is coupled to an inverting input of differential amplifier 70 and to a first end of a first resistor R2. A second end of first resistor R2 is coupled to the drain of NFET S1. A first end of second resistor R2 is coupled to supply voltage VPD and a second end of second resistor R2 is coupled to a first end of second resistor R1 and to a non-inverting input of differential amplifier 70. A second end of second resistor R1 is coupled to the common potential.

A first end of current source 80 is coupled to the non-inverting input of differential amplifier 20, to a first end of capacitor CG, to the drain of NFET S2 and to a non-inverting input of comparator 110. A second end of each of current source 80 and capacitor CG is coupled to the common potential.

A first end of voltage source 120 is coupled to an inverting input of comparator 110 and a second end of voltage source 120 is coupled to the output of differential amplifier 70. An output of comparator 110 is coupled to the drain of NFET S4 and the source of NFET S4 is coupled to the set input of D flip flop 90. The gate of NFET S4 is coupled to the inverted output of D flip flop 90 (connection not shown for simplicity). An inverting input of comparator 100 is coupled to the drain of NFET S1 (connection not shown for simplicity) and a non-inverting input of comparator 100 is coupled to a charge reference voltage denoted VCHARGE. An output of comparator 100 is coupled to the clock input of D flip flop 90. The D input of D flip flop 90 is coupled to a voltage, denoted V+, which represents a logical "1". The noninverted output of D flip flop 90 is coupled to the gate of NFET S3. The drain of NFET S3 is coupled to a first end of resistor R5 and a second end of resistor R5 is coupled to the drain of NFET S1 (connection not shown for simplicity). The source of NFET S3 is coupled to a first end of resistor R6, to a first end of capacitor C1 and to the non-inverting input of comparator 50. A second end of each resistor R6 and capacitor C1 is coupled to the common potential.

In operation, as described above, ramp voltage circuitry 40 is arranged to generate a ramped voltage VG. Specifically, current source 80 is arranged to output a current, denoted IG, which charges capacitor CG. The magnitude of current IG exhibits a fixed value, thereby generating a linear ramped voltage VG across capacitor CG, as described above in relation to EQ. 1. Current source 80 is arranged to drive current IG as long as the voltage across capacitor CG is less than a predetermined value, e.g. less than $V_{CC}$, and not drive current IG when the voltage across capacitor CG is equal to, or greater than, $V_{CC}$. As described above, first function circuitry 30 is arranged to output a predetermined function of the voltage across port capacitor CP. Specifically, the voltage at the output of differential amplifier 70, i.e. voltage VINN_OA2, is given as:

$$VINN\_OA2 = V_{CP} * (R_{R1}/R_{R2}) \quad \text{EQ. 2}$$

where $V_{CP}$ is the voltage across port capacitor CP, i.e. VPD−VPN_OUT, $R_{R1}$ is the resistance value of each of resistors R1 and $R_{R2}$ is the resistance value of each of resistors R2.

As described above, voltage VINN_OA2 is compared with ramped voltage VG and differential amplifier 20 is arranged to control the gate voltage of NFET S1 such that VINN_OA2 is equal to voltage VG. Since VINN_OA2 is a linear function of port capacitor voltage $V_{CP}$, as described in EQ. 2, port capacitor voltage $V_{CP}$ is a ramped voltage, whose value is given as:

$$V_{CP} = VG * (R_{R2}/R_{R1}) \quad \text{EQ. 3}$$

Thus, an inrush current to port capacitor CP is controlled to be equal to a predetermined function of current IG of current source 80 of ramp voltage circuitry 40, responsive to the resistance values of resistors R1 and R2 and the capacitance value of port capacitor CP, specifically:

$$ICP = \frac{C_{CG}}{C_{CP}} * IG * \frac{R_{R2}}{R_{R1}} \quad \text{EQ. 4}$$

where $C_{CP}$ is the capacitance value of port capacitor CP and $C_{CG}$ is the capacitance value of capacitor CG of ramp voltage circuitry 40. $I_{CP}$ is controlled with an accuracy responsive to the accuracy of the values $C_{CP}$ and $C_{CG}$. Typically, $I_{CP}$ need not be carefully controlled and is allowed a broad range of potential limits, e.g. 100 mA-240 mA.

Advantageously, the inrush current of port capacitor CP is limited by inrush current limiting circuitry 10 without the use of an external sense resistor. As described above, the magnitude of the inrush current $I_{CP}$ is controlled by the capacitance values of capacitors CG and CP and the resistance ratio between resistors R1 and R2. As known to those skilled in the art, the resistance ratio between resistors on a chip is known and very accurate.

Comparator 100 is arranged to compare drain voltage VPN_OUT of NFET S1 with charge reference voltage VCHARGE in order to determine whether port capacitor CP has completely charged. In one embodiment, charge reference voltage VCHARGE is selected from the range of 50-100 mV. Particularly, once port capacitor CP has completely charged the voltage value thereacross will be slightly less than supply voltage VPD and drain voltage VPN_OUT will be slightly more than the common potential. Therefore, when VPN_OUT drops below VCHARGE, port capacitor CP is considered charged and comparator 100 is arranged to output a high signal, denoted LATCH_CLK, to the clock input of D flip flop 90. Responsive to high signal LATCH_CLK, D flip flop 90 is arranged to output voltage V+ to the gate of NFET S3. Voltage V+, which is a high voltage, closes NFET S3 thereby coupling drain voltage VPN_OUT to the non-inverting input of comparator 50. Particularly, the voltage divider formed by resistors R5 and R6, and capacitor C1, filters VPN_OUT to reduce noise from reaching the input of comparator 50.

Once drain voltage VPN_OUT is coupled to comparator 50, comparator 50 is arranged to close NFET S2 whenever a short circuit condition is present across port capacitor CP. Particularly, as described above, once port capacitor CP is fully charged the maximum value of drain voltage VPN_OUT in relation to the common potential should be the maximum magnitude of the current flowing through NFET S1 multiplied by the on resistance of NFET S1, the maximum voltage value reflected by reference voltage VREF1. In the event of a short circuit condition across capacitor CP, voltage function VPN_OUT will be greater than VREF1 and comparator 50 closes NFET S2. The closing of NFET S2 rapidly discharges capacitor CG and sinks current IG to the common potential. The value of voltage VG now equals the common potential and as a result differential amplifier 20 switches off NFET S1 thereby ceasing current flow to port capacitor CP. Thus, in the event of a detected short circuit, protection is provided by opening switch NFET S1.

As described above, comparator 50 is arranged to detect a short circuit condition across port capacitor CP after start up, i.e. during operating mode. Similarly, comparator 110 is arranged to detect a short circuit condition across port capacitor CP during start up, i.e. during charge up mode. Specifically, a predetermined function of voltage VINN_OA2 is compared with voltage VG of ramp voltage circuitry 40. As described above, voltage VINN_OA2 is supposed to be equal to voltage VG and a difference between voltages VINN_OA2 and VG is indicative of a short circuit condition across port capacitor CP. The phrase equal to means within an offset value of differential amplifier 20, which is typically in the range of ±5 mV for standard accuracy op-amp, and may drop to a few μV for high-accuracy op-amps. The predetermined function of voltage VINN_OA2 is voltage VINN_OA2 plus a short circuit voltage value output by voltage source 120, denoted VS. In one non-limiting embodiment, short circuit voltage VS is about 20 mV. Particularly, short circuit voltage VS is selected such that VS times the internal gain of differential amplifier 20 is greater than the maximum output voltage range of differential amplifier 20. If the difference between VINN_OA2 and VG is less the maximum output voltage range, differential amplifier 20 is able to compensate for the difference by adjusting the gate voltage of NFET S1 accordingly. If the difference is too great, differential amplifier 20 will no longer be able to compensate and NFET S1 will need to be switched off.

Specifically, as described above, comparator 100 is arranged to output a high signal LATCH_CLK to the clock of D flip flop 90 only when port capacitor CP is fully charged. During start up, signal LATCH_CLK is thus low and the inverted output of D flip flop 90 will be high, i.e. V+. Therefore, while port capacitor CP is charging, NFET S4 is closed and the output of comparator 110 is coupled to the set input of D flip flop 90. When VINN_OA2 doesn't rise as fast VG, i.e. VG is greater than VINN_OA2+VS, the output of comparator 110 is high thereby setting D flip flop 90 to output voltage V+ to the gate of NFET S3. As described above, when NFET S3 is closed, comparator 50 compares a function of VPN_OUT to VREF1. Since port capacitor CP is not yet fully charged, the function of VPN_OUT will be greater than VREF1 and comparator 50 closes NFET S2 thereby drawing voltage VG to the common potential, thus causing differential amplifier 20 to switch off NFET S1.

Figure 3:
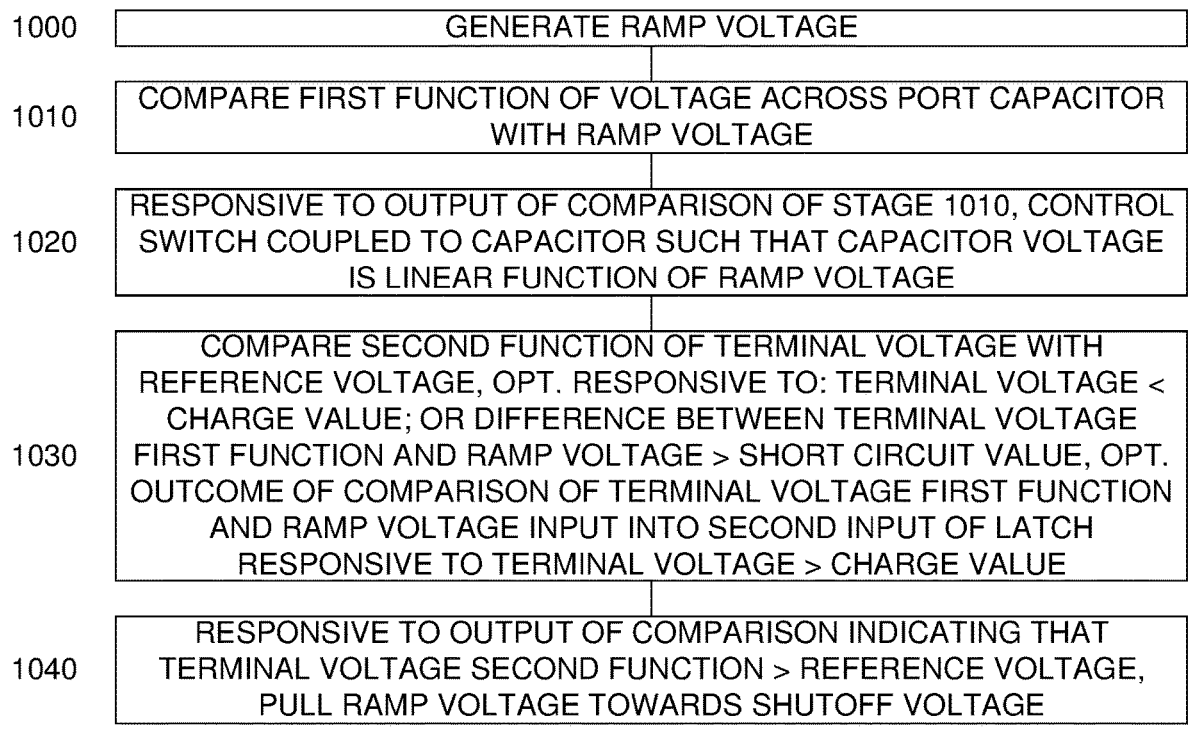
FIG. 3 illustrates a high level flow chart of an inrush current limiting method, according to certain embodiments.

FIG. 3 illustrates a high level flow chart of an inrush current limiting method. In stage 1000, a ramped voltage is generated. In stage 1010, a first function of a voltage across a port capacitor is compared with the generated ramp voltage of stage 1000. In stage 1020, responsive to the outcome of the comparison of stage 1010, an electronically controlled switch coupled to the port capacitor is controlled such that the voltage across the port capacitor is a linear function of the generated ramped voltage of stage 1000. In one embodiment, as described above, the electronically controlled switch is implemented as an NFET, the gate voltage of the NFET controlled responsive to the outcome of the comparison of stage 1010 such that the voltage at the drain thereof is a linear function of the generated ramped voltage of stage 1000. The port capacitor is coupled between a fixed supply voltage and the drain of the NFET, therefore the port capacitor voltage is also linearly ramped.

In stage 1030, a second function of the voltage at a terminal of the electronically controlled switch of stage 1020 is compared with a predetermined reference voltage. Optionally, the comparison is performed responsive to either one of: the voltage at the terminal of the electronically controlled switch being less than a predetermined charge value; and the difference between the first function of the terminal voltage and the generated ramp voltage of stage 1000 being greater than a predetermined short circuit value.

Further optionally, the terminal voltage of the electronically controlled switch is compared with the predetermined charge value and the outcome of the comparison is input into a first input of a latch, optionally a clock input of the latch. Additionally, the first function of the terminal voltage of the electronically controlled switch is compared with the generated ramp voltage and the outcome of the comparison is input into a second input of the latch, optionally a set input of the latch. The comparison of the second function of the terminal voltage of the electronically controlled switch with the predetermined reference voltage is responsive to an output of the latch. As described above, in one embodiment, the output of the latch is arranged to alternately open and close an electronically controlled switch. When the electronically controlled switch is closed the terminal voltage second function is coupled to a comparator and when the electronically controlled switch is open the terminal voltage second function is decoupled from the comparator.

Further optionally, the inputting of the comparison outcome into the second latch input is performed responsive to the outcome of the comparison of the terminal voltage and the predetermined charge value indicating that the terminal voltage is greater than the predetermined charge value, i.e. indicating that the port capacitor is not yet fully charged.

In stage 1040, responsive to the outcome of the comparison of stage 1030 indicating that the second function of the terminal voltage is greater than the predetermined reference voltage, the generated ramp voltage of stage 1000 is pulled towards a shutoff voltage. In the embodiment where the electronically controlled switch of stage 1020 is implemented as an NFET, the source of the NFET is coupled to the shutoff voltage. As shown in the non-limiting embodiments of FIGS. 1 and 2, typically the shutoff voltage is implemented as the common voltage.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An inrush current limit circuitry comprising:
a first electronically controlled switch, a first terminal of said first electronically controlled switch in electrical communication with a port capacitor;
a ramp voltage circuitry arranged to generate a ramped voltage at an output thereof;
a first differential amplifier, a first input of said first differential amplifier arranged to receive a first function of the voltage across the port capacitor, a second input of said first differential amplifier coupled to said output of said ramp voltage circuitry and an output of said first differential amplifier coupled to a second terminal of said first electronically controlled switch such that the voltage across the port capacitor is a linear function of said generated ramped voltage;
a second electronically controlled switch, a first terminal of said second electronically controlled switch coupled to said output of said ramp voltage circuitry and a second terminal of said second electronically controlled switch coupled to a predetermined shutoff potential such that said second electronically controlled switch is arranged in a closed state to pull said output of said ramp voltage circuitry towards said predetermined shutoff potential;
a first comparator, a first input of said first comparator arranged to receive a second function of the voltage at said first terminal of said first electronically controlled switch, a second input of said first comparator arranged to receive a predetermined reference voltage and an output of said first comparator coupled to a third terminal of said second electronically controlled switch such that said second electronically controlled switch is alternately opened and closed responsive to said output of said first comparator;

a third electronically controlled switch, said third electronically controlled switch arranged in a closed state to couple said second function of said first terminal voltage to said first input of said first comparator and arranged in an open state to decouple said second function of said first terminal voltage from said first input of said first comparator; and a control circuitry, said control circuitry arranged to: responsive to said first terminal voltage being less than a predetermined charge value, close said third electronically controlled switch, and responsive to the difference between said first function of said first terminal voltage and said generated ramp voltage being greater than a predetermined short circuit value, close said third electronically controlled switch.

2. The inrush current limit circuitry of claim 1, wherein a third terminal of said first electronically controlled switch is coupled to the predetermined shutoff voltage.

3. The inrush current limit circuitry of claim 1, wherein said control circuitry comprises:

a second comparator, said second comparator arranged to compare said first terminal voltage with said predetermined charge value;

a third comparator, said third comparator arranged to compare said first function of said first terminal voltage with said generated ramp voltage; and a latch, a first input of said latch coupled to an output of said second comparator, a second input of said latch coupled to an output of said third comparator and a first output of said latched coupled to said third electronically controlled switch such that said third electronically controlled switch is alternately opened and closed responsive to said first output of said latch.

4. The inrush current limit circuitry of claim 3, wherein said control circuitry further comprises a fourth electronically controlled switch, said fourth electronically controlled switch arranged in a closed state to couple said output of said third comparator to said second input of said latch and arranged in an open state to decouple said output of said third comparator from said second input of said latch, wherein a second output of said latch is coupled to said fourth electronically controlled switch such that said fourth electronically controlled switch is open when said third electronically controlled switch is closed and said fourth electronically controlled switch is closed when said third electronically controlled switch is open.

5. An inrush current limiting method, the method comprising:

generating a ramped voltage;

comparing a first function of a voltage across a port capacitor with said generated ramp voltage;

responsive to the outcome of said comparison of said voltage first function with said ramp voltage, controlling an electronically controlled switch coupled to the port capacitor such that the voltage across the port capacitor is a linear function of said generated ramped voltage;

responsive to the terminal voltage being less than a predetermined charge value or the difference between the first function of the terminal voltage and said generated ramp voltage being greater than a predetermined short circuit value, comparing a second function of the voltage at a terminal of the electronically controlled switch with a predetermined reference voltage;

responsive to the outcome of said comparison indicating that the second function of the terminal voltage is greater than said predetermined reference voltage, pulling said generated ramp voltage towards a predetermined shutoff voltage;

comparing the terminal voltage with said predetermined charge value;

inputting the outcome of said comparison of the terminal voltage with said predetermined charge value into a first input of a latch;

comparing the first function of the terminal voltage with said generated ramp voltage; and inputting the outcome of said comparison of the terminal voltage first function with said generated ramp voltage into a second input of the latch, wherein said comparison of said second function of the terminal voltage with said predetermined reference voltage is responsive to an output of the latch.

6. The inrush current limiting method of claim 5, wherein said inputting into said second input of said latch is performed responsive to the outcome of said comparison indicating that the terminal voltage is greater than said predetermined charge value.

* * * * *